US012812283B2

(12) United States Patent
Bezen et al.

(10) Patent No.: US 12,812,283 B2
(45) Date of Patent: Nov. 24, 2026

(54) ENVIRONMENT-AWARE SIGNALING FOR WEARABLE AUDIO DEVICES

(71) Applicant: Synaptics Incorporated, San Jose, CA (US)

(72) Inventors: Ran Zvi Bezen, Ramat Gan (IL); Dmitri Lvov, Ramat Hasharon (IL)

(73) Assignee: Synaptics Incorporated, San Jose, CA (US)

( * ) Notice: Subject to any disclaimer, the term of this patent is extended or adjusted under 35 U.S.C. 154(b) by 249 days.

(21) Appl. No.: 18/476,844

(22) Filed: Sep. 28, 2023

(65) Prior Publication Data

US 2025/0113135 A1 Apr. 3, 2025

(51) Int. Cl.

| | |
|---|---|
| ***H04R 1/10*** | (2026.01) |
| ***G06F 3/01*** | (2006.01) |
| ***G06F 3/16*** | (2006.01) |
| ***G10L 17/04*** | (2013.01) |
| ***G10L 17/24*** | (2013.01) |

(52) U.S. Cl.

CPC .......... *H04R 1/1041* (2013.01); *G06F 3/016* (2013.01); *G06F 3/165* (2013.01); *G06F 3/167* (2013.01); *G10L 17/04* (2013.01); *G10L 17/24* (2013.01); *H04R 1/1075* (2013.01); *H04R 2430/01* (2013.01)

(58) Field of Classification Search

CPC .......... G06F 3/016; G06F 3/165; G06F 3/167; G10L 17/04; G10L 17/24; G10L 15/00; H04R 1/1041; H04R 1/1075; H04R 2430/01

USPC .................... 381/92, 74, 312, 56–58; 700/94

See application file for complete search history.

(56) References Cited

U.S. PATENT DOCUMENTS

2005/0050135 A1* 3/2005 Hallermeier .......... G06F 3/0605 709/200
2008/0267416 A1* 10/2008 Goldstein ................ H04R 3/00 381/56
2009/0238386 A1* 9/2009 Usher ..................... G10L 13/00 704/260
2025/0134472 A1* 5/2025 Rozenman ......... A61B 5/02055

OTHER PUBLICATIONS

Doshi, "Audio Deep Learning Made Simple: Automatic Speech Recognition (ASR), How it Works," pp. 1-25, Mar. 25, 2021, https://towardsdatascience.com/audio-deep-learning-made-simple-automatic-speech-recognition-asr-how-it-works-716cfce4c706.

* cited by examiner

*Primary Examiner* — Lun-See Lao
(74) *Attorney, Agent, or Firm* — Paradice & Li LLP

(57) ABSTRACT

This disclosure provides methods, devices, and systems for improving the environmental awareness of a user of a wearable audio device. The present implementations more specifically relate to environment-aware signaling for wearable audio devices. In some aspects, a wearable audio device may include one or more speakers configured for audio playback, one or more microphones configured to detect sounds from the surrounding environment while the audio is concurrently being played back, and an environment awareness controller configured to record the sounds detected by the microphones and control one or more outputs of the wearable audio device based, at least in part, on the recorded sounds. More specifically, the environment awareness controller may activate or adjust such outputs to alert a user of the wearable audio device about the recorded sounds responsive to detecting a trigger condition associated with the alert.

18 Claims, 5 Drawing Sheets

ENVIRONMENT-AWARE SIGNALING FOR WEARABLE AUDIO DEVICES

TECHNICAL FIELD

The present implementations relate generally to wearable audio devices, and specifically to environment-aware signaling for wearable audio devices.

BACKGROUND OF RELATED ART

Wearable audio devices encompass a broad category of audio devices that are designed to be worn on a user's head (such as over or in the user's ears). Many wearable audio devices include speakers for outputting or playing back audio. Example wearable audio devices include headphones, headsets, earbuds, hearing aids, and various other types of "hearables," among other examples. When a wearable audio device is worn on a user's head, the speakers are placed in close proximity to the user's ears such that they cover or at least partially obstruct the ear canals. As a result, wearable audio devices generally provide a more immersive listening experience for audio playback (compared to other types of audio playback devices) while reducing interference from background noise. However, such immersion can also create a sense of isolation or detachment from the surrounding environment.

In some instances, while listening to audio through an existing wearable audio device, a user may fail to hear other people in the surrounding environment communicating with the user. Such disconnect between the user and others in the vicinity can lead to misunderstandings or miscommunications, as well as frustration for people attempting to communicate with the user. The user also may miss important notifications, warnings, or safety cues regarding the surrounding environment. Thus, there is a need to improve a user's environmental awareness while wearing or otherwise listening to audio using a wearable audio device.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method performed by a wearable audio device. The method includes outputting audio to one or more speakers disposed on the wearable audio device; recording sounds detected via one or more microphones disposed on the wearable audio device while concurrently outputting the audio; detecting a trigger condition for alerting a user of the wearable audio device about the recorded sounds; and controlling one or more outputs of the wearable audio device associated with the alert responsive to detecting the trigger condition.

Another innovative aspect of the subject matter of this disclosure can be implemented in a controller for a wearable audio device, including a processing system and a memory. The memory stores instructions that, when executed by the processing system, cause the controller to output audio to one or more speakers disposed on the wearable audio device; record sounds detected via one or more microphones disposed on the wearable audio device while concurrently outputting the audio; detect a trigger condition for alerting a user of the wearable audio device about the recorded sounds; and control one or more outputs of the wearable audio device associated with the alert responsive to detecting the trigger condition.

BRIEF DESCRIPTION OF THE DRAWINGS

The present implementations are illustrated by way of example and are not intended to be limited by the figures of the accompanying drawings.

DETAILED DESCRIPTION

Figure 1:
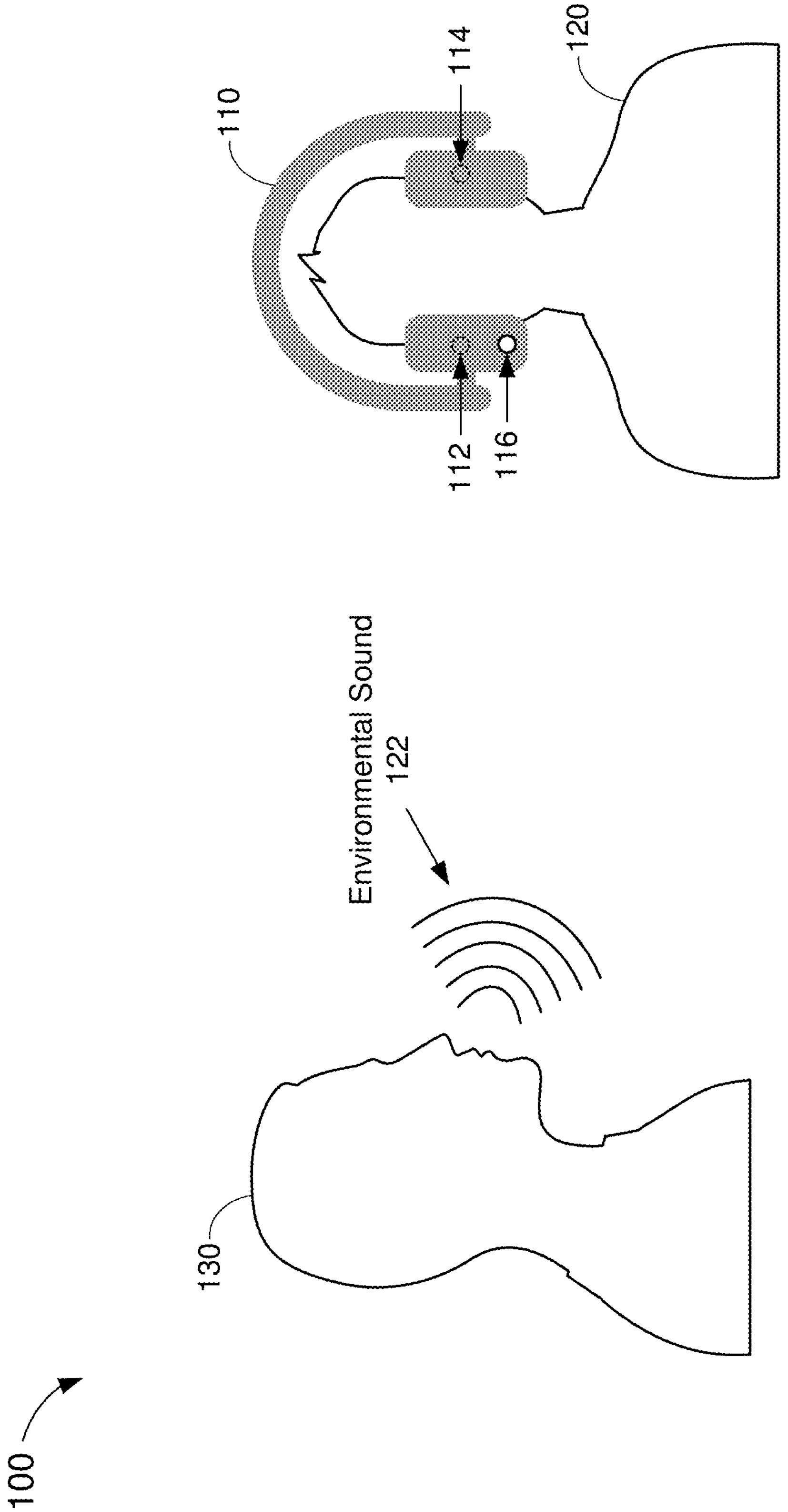
FIG. 1 shows an example listening environment for a wearable audio device.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, wearable audio devices can create a sense of isolation or detachment from the user's environment. For example, while listening to audio through an existing wearable audio device, a user may fail to hear other people in the surrounding environment communicating with the user. Such disconnect between the user and others in the vicinity can lead to misunderstandings or miscommunications, as well as frustration for people attempting to communicate with the user. The user also may miss important notifications, warnings, or safety cues regarding the surrounding environment. Many wearable audio devices include microphones for sensing or detecting sounds. For example, microphones can be used for audio communications (such as voice calls), active noise cancellation (ANC), or various other audio applications. Aspects of the present disclosure recognize that the sounds detected by the microphones disposed on a wearable audio device can also be used to alert the user about important changes to the surrounding environment.

Various aspects relate generally to wearable audio devices, and more particularly, to environment-aware signaling for wearable audio devices. As used herein, the term "environment-aware signaling" refers to various techniques for enhancing the environmental awareness of a user of a wearable audio device. In some aspects, a wearable audio device may include one or more speakers configured for audio playback, one or more microphones configured to detect sounds from the surrounding environment while the audio is concurrently being played back, and an environment awareness controller configured to record the sounds detected by the microphones and control one or more outputs of the wearable audio device based, at least in part, on the recorded sounds. More specifically, the environment awareness controller may activate or adjust such outputs to alert a user of the wearable audio device about the recorded sounds responsive to detecting a trigger condition associated with the alert.

In some aspects, the trigger condition may be associated with user input requesting playback of the recorded sounds. In some other aspects, the trigger condition may be detected from the recorded sounds. For example, the trigger condition may include a detection of words, phrases, or various other sounds associated with the user (such as the user's name) in the recorded sounds. In some implementations, the environment awareness controller may pause the playback of audio in response to detecting the trigger condition. In some other implementations, the environment awareness controller may reduce the audio playback volume in response to detecting the trigger condition. In some other implementations, the environment awareness controller may play back the recorded sounds in response to detecting the trigger condition. Still further, in some implementations, the environment awareness controller may produce a haptic response (such as via a haptic actuator disposed on the wearable audio device) in response to detecting the trigger condition.

Particular implementations of the subject matter described in this disclosure can be implemented to realize one or more of the following potential advantages. By controlling one or more outputs of the wearable audio device in response to detecting a trigger condition associated with environmental sounds, aspects of the present disclosure may alert or otherwise notify the user about sounds or changes in the surrounding environment that the user may wish to be aware of. Example environmental sounds that a user may wish to be aware of include, among other examples, speech from other people communicating with the user or sounds generally associated with danger or violence (such as screaming, crying, glass breaking, gunshots, or explosions). By pausing or reducing the volume of audio playback, aspects of the present disclosure may allow the user to hear environmental sounds more clearly. By playing back the recorded sounds, aspects of the present disclosure may alert the user of missed communications without requiring other people to repeat themselves. By producing a haptic response, aspects of the present disclosure may bring environmental awareness to users with difficulty hearing.

FIG. 1 shows an example listening environment 100 for a wearable audio device 110. The example environment 100 includes a user 120 of the wearable audio device 110 and a person 130 speaking or otherwise attempting to communicate with the user 120. The wearable audio device 110 includes a number of speakers 112 and 114. Although two speakers 112 and 114 are shown in the example of FIG. 1, the wearable audio device 110 may include fewer or more speakers in some other implementations.

As shown in FIG. 1, each of the speakers 112 and 114 is disposed in a respective earcup of the wearable audio device 110 covering the user's ears. As a result, the wearable audio device 110 at least partially blocks or otherwise obstructs sounds 122 from the surrounding environment, including speech from the speaker 130, from entering the user's ears. In other words, the wearable audio device 100 may impair the ability of the user 120 to hear the speaker 130, particularly when audio is played back through the speakers 112 and 114. In the example of FIG. 1, the wearable audio device 110 is depicted as a headset (or headphones) that is designed to be worn on the user's head. However, aspects of the present disclosure are generally applicable to any wearable audio devices designed to isolate audio playback from environmental sounds (such as earbuds, hearing aids, and other types of hearables).

In some aspects, the wearable audio device 110 may further include one or more microphones 116 positioned or otherwise configured to detect the environmental sounds 122. In some implementations, the wearable audio device 110 may record the environmental sounds 122 detected by the microphones 116 and alert the user 120 to any recorded sounds that may be of interest or otherwise require the user's attention. Example sounds of interest may include, among other examples, speech from other people communicating with the user (such as the speaker 130) or sounds generally associated with danger or violence (such as screaming, crying, glass breaking, gunshots, or explosions). In some aspects, the wearable audio device 110 may produce the alert in response to detecting an environmental trigger. As used herein, the term "environmental trigger" or "trigger condition" may refer to any input or event requiring the user's attention to the surrounding environment.

In some implementations, the environmental trigger may be associated with user input requesting playback of the recorded sounds. For example, the user input may be provided by the user 120 through interactions with one or more buttons (not shown for simplicity) or other user interface (UI) features disposed on the wearable audio device 110. In such implementations, the wearable audio device 110 may produce an alert in response to receiving user input associated with a request for playback of the recorded sounds. In some other implementations, the environmental trigger may be associated with the content of the recorded sounds. More specifically, the wearable audio device 110 may analyze the recording of the environmental sounds 122 for words, phrases, or other sounds that may be of interest to the user 120 (such as the user's name). In such implementations, the wearable audio device 110 may produce an alert in response to detecting environmental sounds of interest.

The wearable audio device 110 may alert the user 120 to important sounds or changes in the surrounding environment by activating or adjusting one or more of its outputs. In some aspects, such outputs may include audio output by the speakers 112 and 114. In some implementations, the wearable audio device 110 may reduce the volume of audio being played back by the speakers 112 and 114 in response to detecting an environmental trigger. In some other implementations, the wearable audio device 110 may pause the playback of audio from the speakers 112 and 114 in response to detecting an environmental trigger. Still further, in some implementations, the wearable audio device 110 may play back at least part of the recording of the environmental sounds 122 in response to detecting an environmental trigger.

Aspects of the present disclosure recognize that some people with hearing impairments may use wearable audio devices (such as hearing aids) to improve their ability to hear environmental sounds. For such applications, pausing or reducing the volume of audio playback may not improve the user's environmental awareness. Thus, in some other aspects, the wearable audio device 110 may alert the user 120 to important sounds or changes in the surrounding environment using different sensory stimuli (other than auditory stimuli). In some implementations, such sensory stimuli may be provided by one or more haptic actuators disposed on the wearable audio device 110 (not shown for simplicity). In such implementations, the wearable audio device 110 may provide haptic feedback to the user 120, via the haptic actuators, in response to detecting an environmental trigger.

Figure 2:
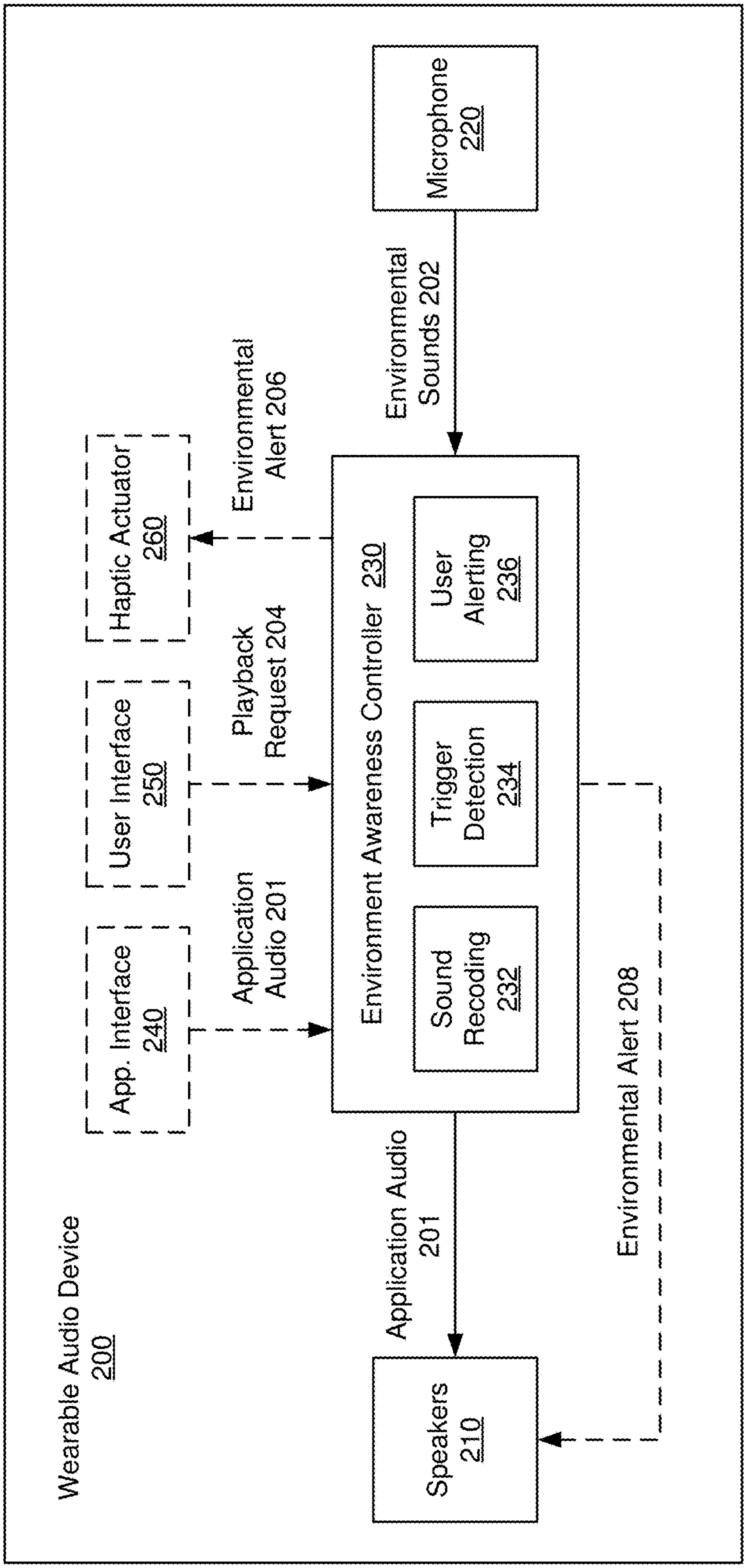
FIG. 2 shows a block diagram of an example wearable audio device, according to some implementations.

FIG. 2 shows a block diagram of an example wearable audio device 200, according to some implementations. The wearable audio device 200 is configured to enhance a user's environmental awareness while wearing or otherwise using the wearable audio device 200. In some implementations, the wearable audio device 200 may be one example of the wearable audio device 110 of FIG. 1.

The wearable audio device 200 includes one or more speakers 210, one or more microphones 220, and an environment awareness controller 230. The microphones 220 are configured to sense or detect environmental sounds 202 in the form of acoustic waves propagating through the surrounding environment and convert the detected sounds to an electrical signal (also referred to as an "audio signal") representative of the acoustic waveform. The speakers 210 are configured to convert audio signals into acoustic waves, via electroacoustic transducers, that can be output or played back to the user of the wearable audio device 200. With reference to FIG. 1, the speakers 210 may be one example of the speakers 112 and 114 and the microphones 220 may be one example of the microphones 116.

The environment awareness controller 230 receives the environmental sounds 202 detected by the microphones 220 and provides application audio 201 to the speakers 210 for output. In some implementations, the application audio 201 may include the environmental sounds 202 detected via the microphone 220 (such as for hearing aids or other environmental sound amplification applications). In some other implementations, the application audio 201 may include audio generated or otherwise produced by another application separate from the microphone 220. In such implementations, the environment awareness controller 230 may receive the application audio 201 via an application interface 240 which communicates with other devices or applications that produce audio for playback. Example suitable audio playback applications include media players, interactive gaming, and teleconferencing applications, among other examples.

In some aspects, the environment awareness controller 230 may enhance the user's awareness of the surrounding environment based, at least in part, on the environmental sounds 202 detected via the microphones 220 while concurrently playing back the application audio 201 via the speakers 210. The environment awareness controller 230 may include a sound recording component 232, a trigger detection component 234, and a user alerting component 236. The sound recording component 232 is configured to record or store the environmental sounds 202. In some implementations, the sound recording component 232 may include a cyclic buffer that continuously records the environmental sounds 202 in a circular loop. In some implementations, the sound recording component 232 may compress the recording to reduce the amount of memory required for storage. In some other implementations, the user may configure or adjust the duration of the recording to be buffered or stored by the sound recording component 232.

The trigger detection component 234 is configured to detect environmental triggers associated with the recorded environmental sounds 202. In some implementations, the environmental triggers may include a request to play back the recorded sounds. In such implementations, the trigger detection component may receive a playback request 204 via a user interface 250. For example, the user interface 250 may include one or more mechanical or electrical actuators (such as buttons, switches, toggles, or touch sensors) that can be used to provide user inputs associated with the playback request 204. In some other implementations, the environmental triggers may include words, phrases, or sounds that can be detected in the recording. For example, a user may specify which words, phrases, or sounds to associate with environmental triggers during a user enrollment operation that registers the user with the wearable audio device 200. In such implementations, the trigger detection component 234 may analyze the recorded environmental sounds 202 for environmental triggers associated with the user.

In some aspects, the trigger detection component 234 may analyze the recorded environmental sounds 202 based on a machine learning model. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules (also referred to as a machine learning "model") that can be used to describe each of the answers. During the inferencing phase, the machine learning system may infer answers from new data using the learned set of rules. In some implementations, the machine learning model may be trained to detect one or more sounds that can be associated with environmental triggers (such as screaming, crying, gunshots, explosions, or other sounds generally associated with danger or violence).

In some other implementations, the machine learning model may be trained to process human speech. More specifically, the machine learning model may be used to perform a speech-to-text conversion operation that converts sounds or phonemes associated with speech to strings of characters representing words or phrases. Aspects of the present disclosure recognize that, in conversational speech, it is often customary to address a person by their name (such as to obtain their attention) before engaging in dialog with that person. Thus, in some implementations, the trigger detection component 234 may associated the name of the user of the wearable audio device 200 with an environmental trigger for that user. More specifically, the trigger detection component 234 may use the machine learning model to detect the name of the user in the environmental sounds 202.

The user alerting component 236 is configured to alert the user about the environmental sounds 202 when an environmental trigger is detected. In some implementations, the user of the wearable audio device 200 may specify or configure one or more environmental alerts during a user enrollment operation. The user alerting component 236 may implement an environmental alert, in response to detecting an environmental trigger, by controlling or adjusting one or more outputs of the wearable audio device 200. In some aspects, the environmental alert may cause the user alerting component 236 to reduce the volume of the application audio 201. In some other aspects, the environmental alert may cause the user alerting component 236 to pause or stop playback of the application audio 201. In some other aspects, the user alerting component 236 may provide an environmental alert 206 to a haptic actuator 260 in response to detecting an environmental trigger. In such aspects, the environmental alert 206 may cause the haptic actuator 260 to generate a pattern of haptic feedback (or vibrations).

In some other aspects, the user alerting component 236 may provide an environmental alert 208 to the speakers 210 in response to detecting an environmental trigger. In such aspects, the environmental alert 208 may include a pattern of sounds or audio to be output or played back by the speakers 210. In some implementations, the environmental alert 208 may include one or more audible tones for alerting the user that an environmental trigger has been detected. For example, the tones may be configured or selected by the user during the user enrollment operation. In some other implementations, the environmental alert 208 may include at least a portion of the recording of the environmental sounds 202. For example, the user alerting component 236 may output the recoding to the speakers 210 in response to receiving a playback request 204 via the user interface 250. In some implementations, the user may configure or adjust the playback speed of the recording. In some implementations, the user may request to play back the same recording multiple times.

Figure 3:
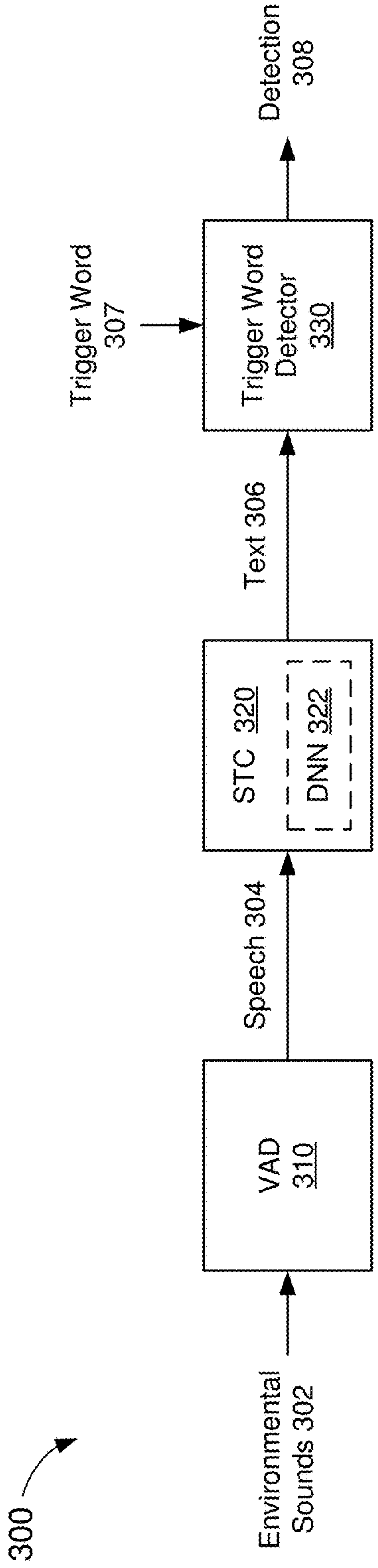
FIG. 3 shows a block diagram of an example environmental trigger detection system, according to some implementations.

FIG. 3 shows a block diagram of an example environmental trigger detection system 300, according to some implementations. The trigger detection system 300 is configured to detect one or more trigger words 307 in environmental sounds 302 captured or recorded by a wearable audio device. In some implementations, the trigger detection system 300 may be one example of the trigger detection component 234 of FIG. 2. With reference to FIG. 2, the environmental sounds 302 may be one example of the environmental sounds 202 detected by the microphones 220.

The environmental trigger detection system 300 includes a voice activity detector (VAD) 310, a speech-to-text converter (STC) 320, and a trigger word detector 330. The VAD 310 is configured to detect a presence of human speech 304 in the environmental sounds 302. In some implementations, the VAD 310 may implement a machine learning model trained to predict or infer a probability of speech in each frame of the environmental sounds 302. In such implementations, the VAD 310 may selectively output one or more frames of the environmental sounds 302, as detected speech 304, based on the inferences produced by the machine learning model. For example, the VAD 310 may output any frames of the environment sounds 302 having a probability of speech greater than or equal to a threshold probability.

The STC 320 is configured to convert the speech 304 to text 306. More specifically, the STC 320 may perform a speech-to-text conversion operation that converts sounds or phonemes associated with the speech 304 to strings of characters representing the text 306. In some implementations, the STC 320 may perform the speech-to-text conversion based on a deep neural network (DNN) 322. Deep learning is a particular form of machine learning in which the inferencing and training phases are performed over multiple layers. Deep learning architectures are often referred to as "artificial neural networks" due to the manner in which information is processed (similar to a biological nervous system). For example, each layer of an artificial neural network may be composed of one or more "neurons." Each layer of neurons may perform a different transformation on the output data from a preceding layer so that the final output of the neural network results in the desired inferences. The set of transformations associated with the various layers of the network is referred to as a "neural network model." Example suitable DNNs for speech-to-text conversion include convolutional neural network (CNNs) and recurrent neural network (RNNs), among other examples.

For example, the STC 320 may first convert each frame of speech 304 (in the time domain) to a respective mel spectrogram (in the frequency domain) based on a mel frequency cepstral coefficient (MFCC) transform. After collecting or buffering a threshold number (N) of spectrograms (representing a threshold duration of speech), the STC 320 may provide the N spectrograms as inputs to a CNN which outputs feature maps based on the spectrograms. The feature maps may be provided as inputs to a long short-term memory (LSTM), or RNN having a number of bidirectional layers, which produces a number of discrete outputs (each representing a respective "timestep"). The outputs of the LSTM are provided as inputs to a fully connected (linear) layer which infers character probabilities for each timestep of the LSTM output based on a softmax function. The STC 320 may further decode the character probabilities based on a connectionist temporal classification (CTC) algorithm to recover the sequence of characters for the text 306.

The trigger word detector 330 is configured to search the string of text 306 for matching trigger words 307. In some implementations, the trigger words 307 may be associated with a user of the wearable audio device (such as the user's name). For example, the user may provide or otherwise indicate the trigger words 307 to the environmental trigger detection system 300 during a user enrollment operation. In some implementations, the trigger word detector 330 may compare each sequence of characters in the text 306 with the trigger words 307 and output a detection result 308 indicating whether a match has been detected. With reference for example to FIG. 2, the detection result 308 may be, or include, an environmental trigger when the trigger word detector 330 identifies one or more matching trigger words 307 in the text 306.

Figure 4:
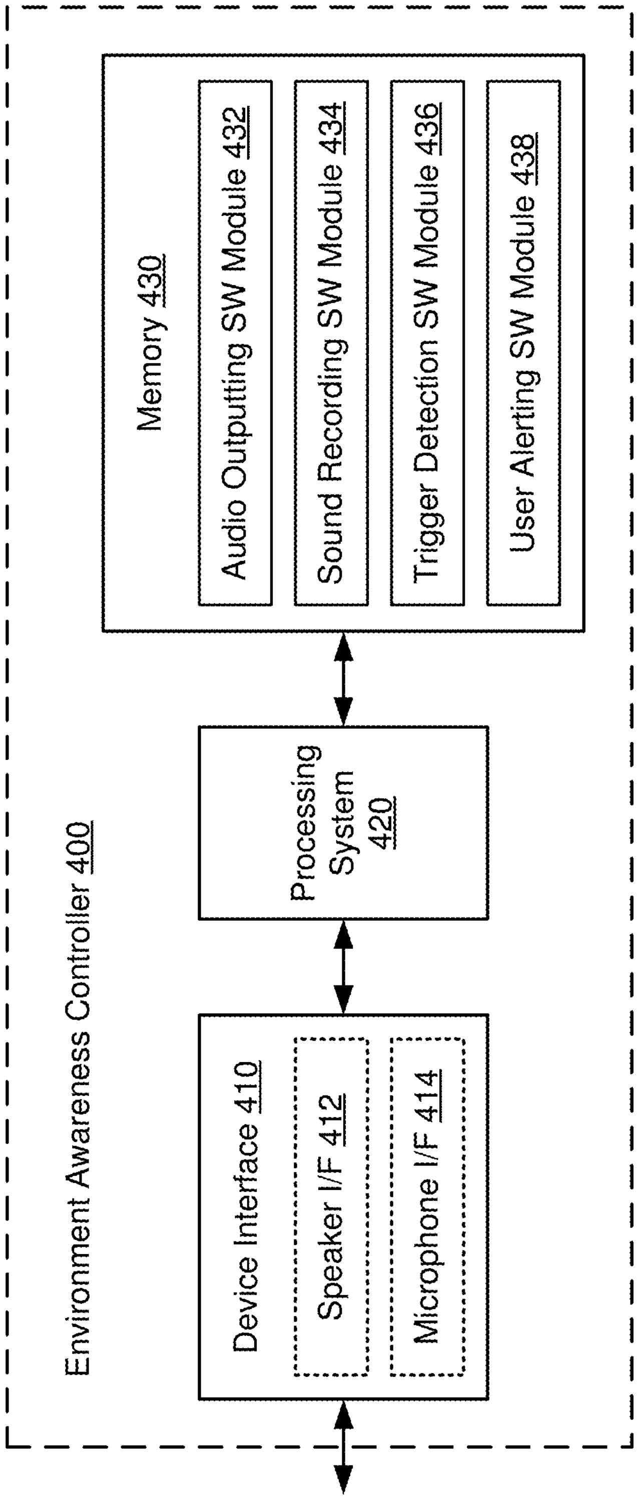
FIG. 4 shows a block diagram of an example environment awareness controller, according to some implementations.

FIG. 4 shows a block diagram of an example environment awareness controller 400, according to some implementations. In some implementations, the environment awareness controller 400 may be one example of the environment awareness controller 230 of FIG. 2. Thus, the environment awareness controller 400 is configured to enhance the environmental awareness of a user while wearing or otherwise using a wearable audio device (such as the wearable audio device 200 of FIG. 2).

The environment awareness controller 400 includes a device interface 410, a processing system 420, and a memory 430. The device interface 410 is configured to communicate with one or more components of the wearable audio device. In some implementations, the device interface 410 may include a speaker interface (I/F) 412 and a microphone interface (I/F) 414. The speaker interface 412 is configured to communicate with one or more speakers disposed on the wearable audio device (such as the speakers 210 of FIG. 2). The microphone interface 414 is configured to communicate with one or more microphones disposed on the wearable audio device (such as the microphones 220 of FIG. 2).

The memory 430 may include a non-transitory computer-readable medium (including one or more nonvolatile memory elements, such as EPROM, EEPROM, Flash memory, or a hard drive, among other examples) that may store at least the following software (SW) modules:

- an audio outputting SW module 432 to output audio to one or more speakers disposed on the wearable audio device;
- a sound recording SW module 434 to record sounds detected via one or more microphones disposed on the wearable audio device while concurrently outputting the audio;
- a trigger detection SW module 436 to detect a trigger condition for alerting a user of the wearable audio device about the recorded sounds; and
- a user alerting SW module 438 to control one or more outputs of the wearable audio device associated with the alert responsive to detecting the trigger condition.

Each software module includes instructions that, when executed by the processing system 420, causes the environment awareness controller 400 to perform the corresponding functions.

The processing system 420 may include any suitable one or more processors capable of executing scripts or instructions of one or more software programs stored in the environment awareness controller 400 (such as in the memory 430). For example, the processing system 420 may execute the audio outputting SW module 432 to output audio to one or more speakers disposed on the wearable audio device. The processing system 420 also may execute the sound recording SW module 434 to record sounds detected via one or more microphones disposed on the wearable audio device while concurrently outputting the audio. Further, the processing system 420 may execute the trigger detection SW module 436 to detect a trigger condition for alerting a user of the wearable audio device about the recorded sounds. Still further, the processing system 420 may execute the user alerting SW module 438 to control one or more outputs of the wearable audio device associated with the alert responsive to detecting the trigger condition.

Figure 5:
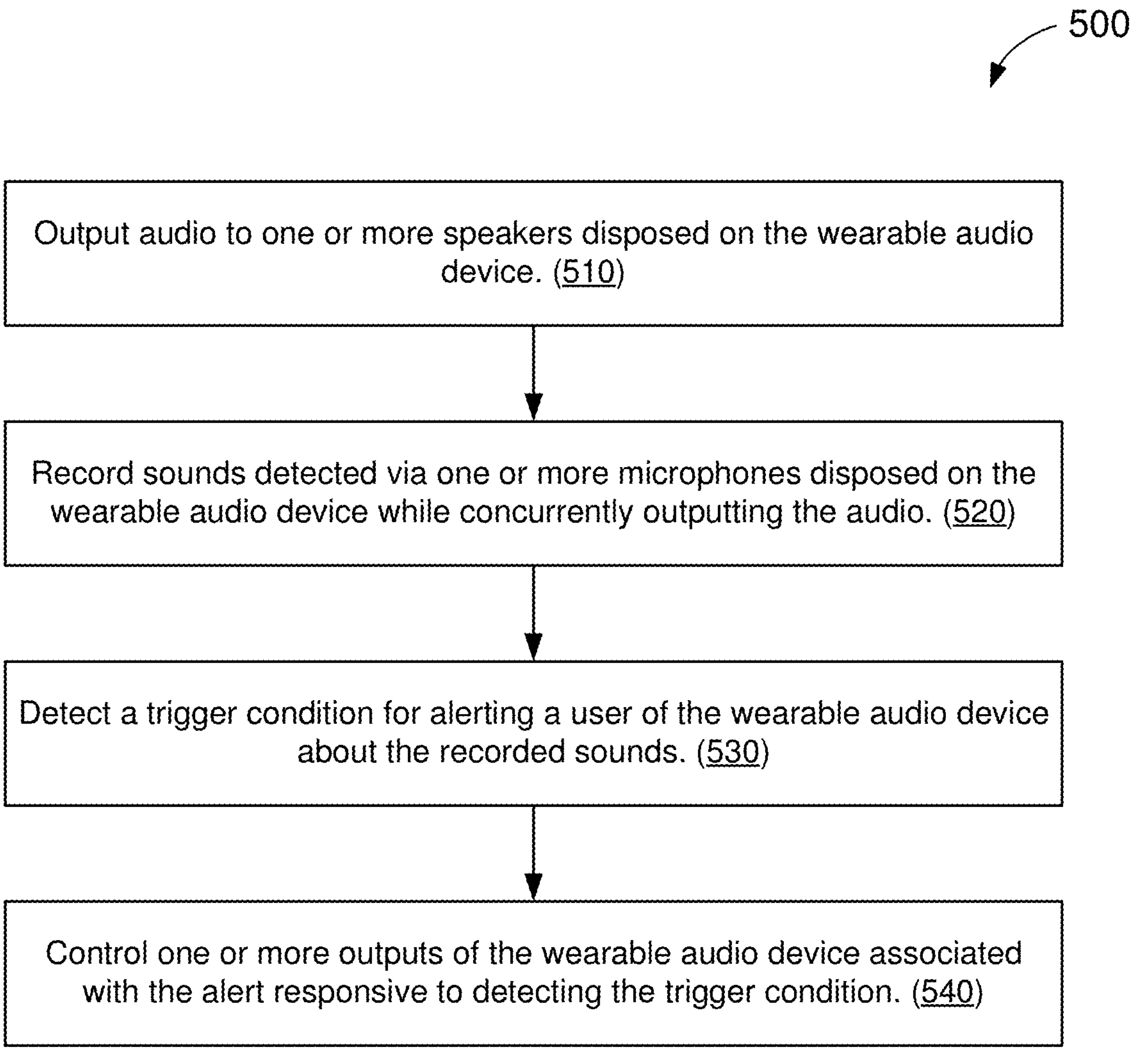
FIG. 5 shows an illustrative flowchart depicting an example operation for environment-aware signaling, according to some implementations.

FIG. 5 shows an illustrative flowchart depicting an example operation 500 for environment-aware signaling, according to some implementations. In some implementations, the example operation 500 may be performed by an environment awareness controller for a wearable audio device, such as any of the environment awareness controllers 230 or 400 of FIGS. 2 and 4, respectively.

The environment awareness controller outputs audio to one or more speakers disposed on the wearable audio device (510). The environment awareness controller records sounds detected via one or more microphones disposed on the wearable audio device while concurrently outputting the audio (520). The environment awareness controller detects a trigger condition for alerting a user of the wearable audio device about the recorded sounds (530). The environment awareness controller controls one or more outputs of the wearable audio device associated with the alert responsive to detecting the trigger condition (540).

In some aspects, the detecting of the trigger condition may include receiving user input indicating a request to play back the recorded sounds. In some other aspects, the trigger condition may be detected based on the recorded sounds. In some implementations, the detecting of the trigger condition may include performing a speech-to-text conversion operation that converts the recorded sounds to a string of text and identifying a trigger word in the string of text. In some implementations, the trigger word may be associated with the user of the wearable audio device. In some implementations, the environment awareness controller may receive user input indicating the trigger word during a user enrollment operation that registers the user with the wearable audio device.

In some implementations, the controlling of the one or more outputs may include pausing the output of audio to the one or more speakers responsive to detecting the trigger condition. In some other implementations, the controlling of the one or more outputs may include reducing a volume of the audio output to the one or more speakers responsive to detecting the trigger condition. In some other implementations, the controlling of the one or more outputs may include playing back the recorded sounds via the one or more speakers responsive to detecting the trigger condition. Still further, in some implementations, the controlling of the one or more outputs may include generating a haptic response via one or more haptic actuators disposed on the wearable audio device responsive to detecting the trigger condition.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a controller for a wearable audio device, comprising:

outputting audio to one or more speakers disposed on the wearable audio device;

detecting sounds via one or more microphones disposed on the wearable audio device;

recording the detected sounds while concurrently outputting the audio;

storing the recorded sounds in a cyclic buffer associated with the wearable audio device;

detecting a trigger condition for alerting a user of the wearable audio device about the recorded sounds;

retrieving at least a portion of the recorded sounds from the cyclic buffer responsive to detecting the trigger condition; and playing back the recorded sounds retrieved from the cyclic buffer via the one or more speakers.

2. The method of claim 1, wherein the detecting of the trigger condition comprises:

receiving user input indicating a request to play back the recorded sounds.

3. The method of claim 1, wherein the trigger condition is detected based on the recorded sounds.

4. The method of claim 3, wherein the detecting of the trigger condition comprises:

performing a speech-to-text conversion operation that converts the recorded sounds to a string of text; and identifying a trigger word in the string of text.

5. The method of claim 4, wherein the trigger word is associated with the user of the wearable audio device.

6. The method of claim 5, further comprising:

receiving user input indicating the trigger word during a user enrollment operation that registers the user with the wearable audio device.

7. The method of claim 1, wherein the controlling of the one or more outputs further includes:

pausing the output of audio to the one or more speakers responsive to detecting the trigger condition.

8. The method of claim 1, wherein the controlling of the one or more outputs further includes:

reducing a volume of the audio output to the one or more speakers responsive to detecting the trigger condition.

9. The method of claim 1, wherein the controlling of the one or more outputs further includes:

generating a haptic response via one or more haptic actuators disposed on the wearable audio device responsive to detecting the trigger condition.

10. A controller for a wearable audio device, comprising:

a processing system; and a memory storing instructions that, when executed by the processing system, causes the controller to:

output audio to one or more speakers disposed on the wearable audio device;

detect sounds via one or more microphones disposed on the wearable audio device;

record the detected sounds while concurrently outputting the audio;

store the recorded sounds in a cyclic buffer associated with the wearable audio device;

detect a trigger condition for alerting a user of the wearable audio device about the recorded sounds;

retrieve at least a portion of the recorded sounds from the cyclic buffer responsive to detecting the trigger condition; and play back the recorded sounds retrieved from the cyclic buffer via the one or more speakers.

11. The controller of claim 10, wherein the detecting of the trigger condition comprises:

receiving user input indicating a request to play back the recorded sounds.

12. The controller of claim 10, wherein the trigger condition is detected based on the recorded sounds.

13. The controller of claim 12, wherein the detecting of the trigger condition comprises:

performing a speech-to-text conversion operation that converts the recorded sounds to a string of text; and identifying a trigger word in the string of text.

14. The controller of claim 13, wherein the trigger word is associated with the user of the wearable audio device.

15. The controller of claim 14, wherein execution of the instructions further causes the controller to:

receive user input indicating the trigger word during a user enrollment operation that registers the user with the wearable audio device.

16. The controller of claim 10, wherein the controlling of the one or more outputs further includes:

pausing the output of audio to the one or more speakers responsive to detecting the trigger condition.

17. The controller of claim 10, wherein the controlling of the one or more outputs further includes:

reducing a volume of the audio output to the one or more speakers responsive to detecting the trigger condition.

18. The controller of claim 10, wherein the controlling of the one or more outputs further includes:

generating a haptic response via one or more haptic actuators disposed on the wearable audio device responsive to detecting the trigger condition.

* * * * *